(12) United States Patent
Welch

(10) Patent No.: US 10,539,212 B2
(45) Date of Patent: Jan. 21, 2020

(54) TWO PIECE CENTERING FLANGE

(71) Applicant: SCHAEFFLER TECHNOLOGIES AG & CO. KG, Herzogenaurach (DE)

(72) Inventor: Christopher Welch, Creston, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 146 days.

(21) Appl. No.: 15/808,261

(22) Filed: Nov. 9, 2017

(65) Prior Publication Data
US 2019/0136950 A1    May 9, 2019

(51) Int. Cl.
*F16H 41/28*    (2006.01)
*B23K 101/00*    (2006.01)

(52) U.S. Cl.
CPC ........ *F16H 41/28* (2013.01); *B23K 2101/001* (2018.08)

(58) Field of Classification Search
CPC .............................. F16H 41/28; F16H 41/04
USPC ............................................................ 60/330
See application file for complete search history.

(56) References Cited

U.S. PATENT DOCUMENTS

2013/0056319 A1* 3/2013 Lindemann ............. F16H 45/02
192/3.29
2015/0008086 A1* 1/2015 Mototsune .............. F16H 45/02
192/3.29

* cited by examiner

*Primary Examiner* — Michael Leslie
*Assistant Examiner* — Daniel S Collins
(74) *Attorney, Agent, or Firm* — Brooks Kushman P.C.

(57) ABSTRACT

A flange for a torque converter, comprising a first sub-assembly that includes a first hole and second hole located along the first sub-assembly and wherein the first and second hole are configured to facilitate movement of a first pressure path from a transmission input shaft to a piston. The flange for the torque converter also includes a second sub-assembly that includes one or more welds that join a first contact-side of the second sub-assembly to the first sub-assembly, wherein a gap is defined between an area where the second sub-assembly is joined to the first sub-assembly.

19 Claims, 4 Drawing Sheets

TWO PIECE CENTERING FLANGE

TECHNICAL FIELD

The disclosure may be related generally to a centering flange, such as a centering flange that may be used in a torque converter.

BACKGROUND

Flow behind the centering flange may be useful to maintain a durable connection between the centering flange and cover. The centering flange may also be welded during the manufacturing process.

SUMMARY

A first embodiment discloses a flange for a torque converter, comprising a first sub-assembly that includes a first hole and second hole located along the first sub-assembly and wherein the first and second hole are configured to facilitate movement of a first pressure path from a transmission input shaft to a piston. The flange for the torque converter also includes a second sub-assembly that includes one or more welds that join a first contact-side of the second sub-assembly to the first sub-assembly, wherein a gap is defined between an area where the second sub-assembly is joined to the first sub-assembly.

A second embodiment discloses a method of manufacturing a flange for a torque converter that includes forming one or more holes in a top-portion of a first sub-assembly of the torque converter, wherein the holes are arranged to facilitate movement along a first fluid-pressure path from a transmission input shaft to a piston, wherein the first fluid-pressure path is formed along at least between a gap between the first and second sub-assembly. The method further includes welding a first contact-point and second contact-point of the first sub-assembly and a second sub-assembly, such that the gap is defined between the first contact-point and the second contact-point of the first and second sub-assembly and cooling the first sub-assembly and second sub-assembly until the first and second sub-assembly are joined.

A third embodiment discloses a flange for a torque converter comprising a first sub-assembly that includes a top portion with one or more holes along the top portion and a second sub-assembly that includes a plurality of welds that join the second sub-assembly to the first sub-assembly, wherein the second sub-assembly is configured to form a gap between a first weld and a second weld and between the first sub-assembly and the second sub-assembly.

DETAILED DESCRIPTION

As required, detailed embodiments are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
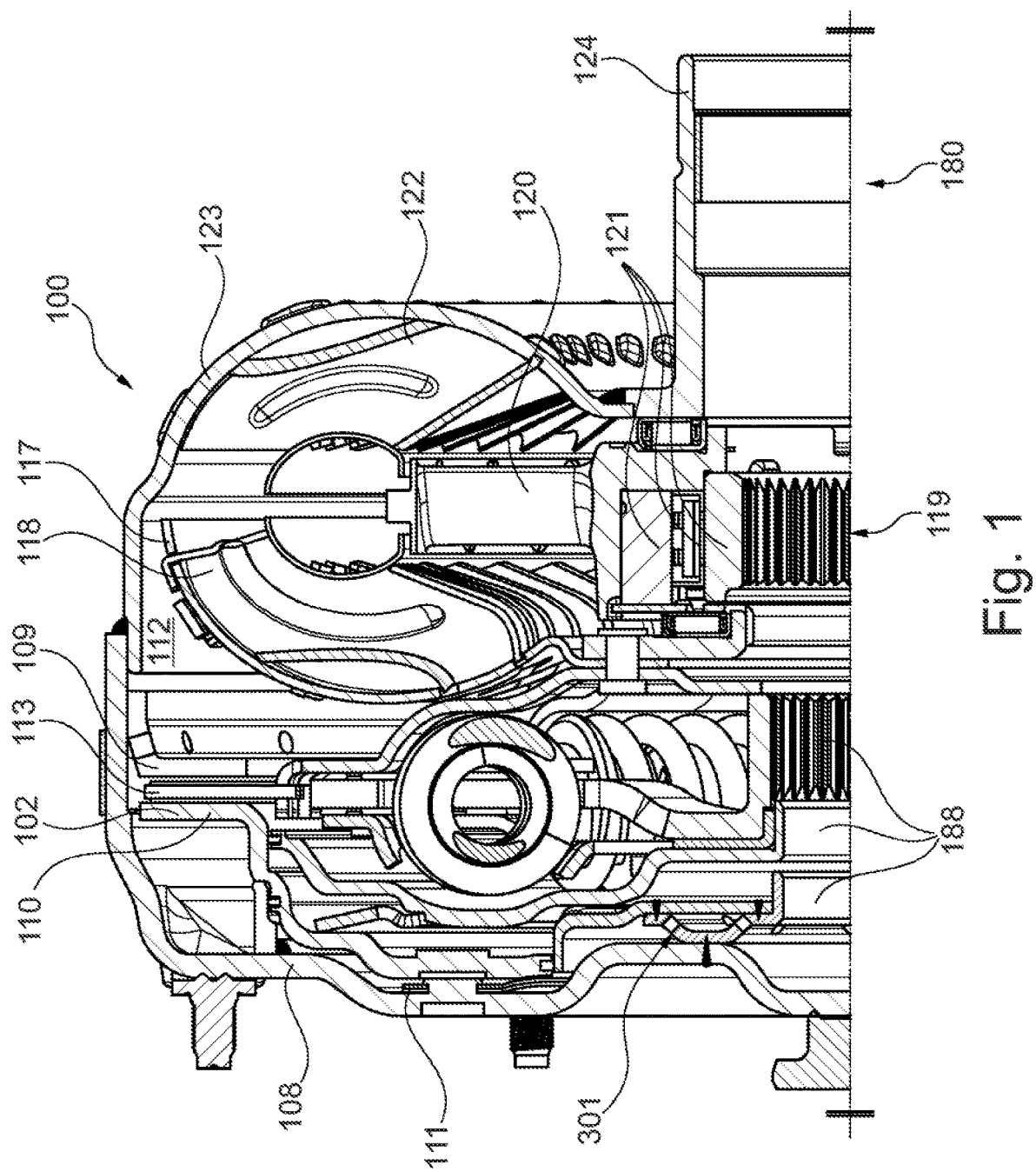
FIG. 1 is a cross-section view of a portion of torque converter.

FIG. 1 is a top half section view of four-pass torque converter 100 having torque converter clutch, or lockup clutch. Torque converter 100 may include an impeller shell 123, backing plate 109, and cover 108. Shell and cover may form a housing for converter 100. Clutch 102 may include piston plate 110 rotationally fixed to cover 108 by leaf spring 111, and clutch plate 113.

Hydraulic chamber 112 may be partially defined by an impeller shell 123 and a backing plate 109. For example, a portion of the walls that divide chamber 112 from the other portions of converter 100 are made up of at least portions of turbine shell 117 and backing plate 109. The housing and plate may prevent fluid exchange between chamber 112 and other chambers in converter 100. In an example embodiment, torque converter 100 may include turbine 118 (with a turbine shell 117), stator 120, and impeller 122 disposed within chamber 112. In certain embodiments, chamber 112 may be used for being pressurized to prevent cavitation in turbine 118, stator 120, or impeller 122.

Converter 100 may be assembled with a transmission 180. The transmission 180 may include a hydraulic path or transmission shaft disposed radially between torque converter impeller hub 124 and stator shaft and a hydraulic path disposed within bore 188 of input shaft 182. The transmission may include a sleeve disposed within input shaft bore 188. Transmission may also include hydraulic path that is disposed radially between transmission input shaft 182 and a sleeve.

A turbine shell 117 may be fixed to a turbine hub 119 by a fastener such as a rivet. The hub may be arranged for torque transmission to input shaft 182. The turbine hub 119 and shaft 182 may include mating splines in driving engagement so that torque received by the shell is transmitted to input shaft 182. In an example embodiment, the hub 119 may include a flow passage for pressure equalization in chamber 112. Stator 120 may be axially positioned by bearings and a side plate. A one-way clutch 121 may include an inner race that may be drivingly engaged with a stator shaft.

A centering flange 301 may be used keep the sealing surfaces of the piston plate 110 and input shaft 182 centered to one another. Such a centering flange 301 may provide a reduced resistance when applying the piston. When the piston is applied, fluid pressure may act against the piston to engage the clutch. When the clutch is released, the pressure acting on the piston may be reduced to allow the piston to move (e.g. move in a first axial direction towards the cover 108). For example, a low-pressure path may be used to reduce reaction force on piston when applying the piston. Holes within the centering flange may allow fluid pressure flow during both stroke and release of the piston.

Figure 2:
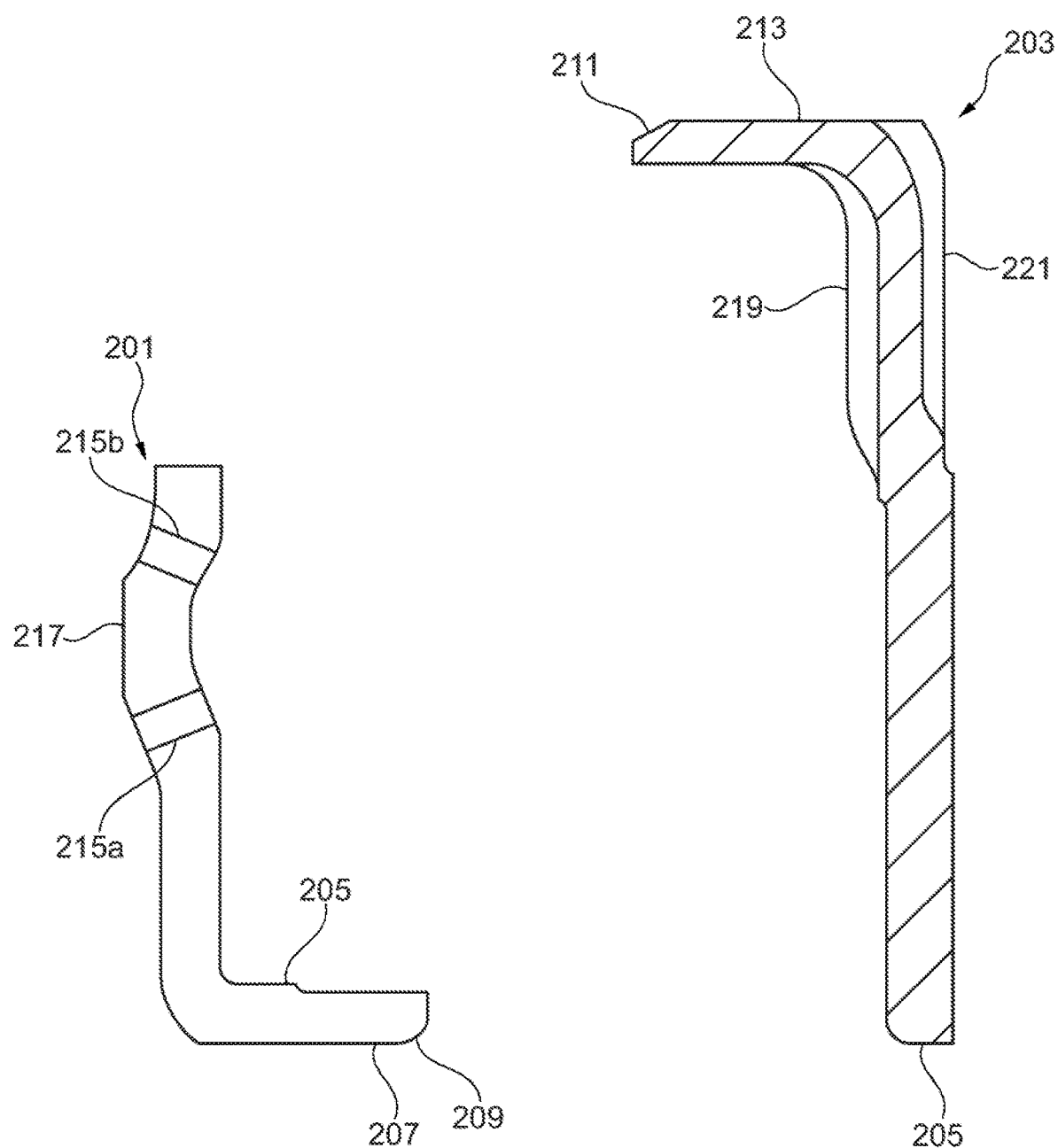
FIG. 2 is an illustration of an embodiment of an exploded view of a partial cross-sectional view of sub-assembly of a centering flange for a torque converter.

FIG. 2 is an example of an exploded view of the top view perspective of sub-assemblies for a centering flange for a torque converter. Specifically, the centering flange 301 may be utilized in a 4-pass torque converter design, such as the 4-pass torque converter described in FIG. 1. The centering flange 301 may include a first sub-assembly 201 and a second sub-assembly 203. During the stamping process of the centering flange plates, holes 215 may be pierced or inserted on either side of the first sub-assembly 201 of the centering flange. The holes 215 may be pierced at sections of a curvature of the sub-assembly, as shown in FIG. 2. The first sub-assembly 201 may be connected to a cover 108 assembly of the torque converter 100, such as cover 108 of the torque converter 100 shown in FIG. 1. The holes 215 may be pierced into one plate to allow flow within a continuous weld between the centering flange subassembly and the cover assembly. The first sub-assembly 201 may be have a contact side 217 that is contact with a cover weld surface.

A second sub-assembly 203 may also make up the centering flange. The second sub-assembly may be joined with the first sub-assembly 201 through a welding process, such as laser welding. Both the first sub-assembly 201 and second sub-assembly 203 may utilize a center surface 205. The centering surface 205 may allow alignment of the first and second sub-assemblies. For example, the centering surface 205 may allow alignment of the second sub-assembly 203 with a radially outward surface on an arm or portion of the first sub-assembly 201. A portion of the first sub-assembly 201 may have a sealed lead-in portion 209 to contact the seal on the transmission input shaft. The second sub-assembly 203 may be also include a first recess 219 that is located on a side of the second sub-assembly 203 that is in contact with the first sub-assembly 201 and that may be formed as a result of stamping a second recess 221. Additionally, the second sub-assembly 203 may include a second recess 221 that is on the opposite side, or the side that is not in contact with the first sub-assembly 201. The second recess 221 may help facilitate movement of the fluid pressure path on the side that is not in contact with the first sub-assembly 201. Additionally, the second recess 221 may be a laser weld surface to join the centering flange or second sub-assembly 203 to a dam plate of the torque converter in a four-pass torque converter design. By removing the dam plate in the torque converter, the centering flange may be used in a 3-pass torque converter design,. The removal of the dam plate in the torque converter will remove a corresponding chamber from the torque converter, which will allow the centering flange to be utilized in a 3-pass torque converter design that allows pressure to flow as set forth below. The second sub-assembly 203 may also include a sealed lead in 211 to a piston. Additionally, the second sub-assembly 203 may have a sealing surface 213 that is sealed to the piston.

Figure 3:
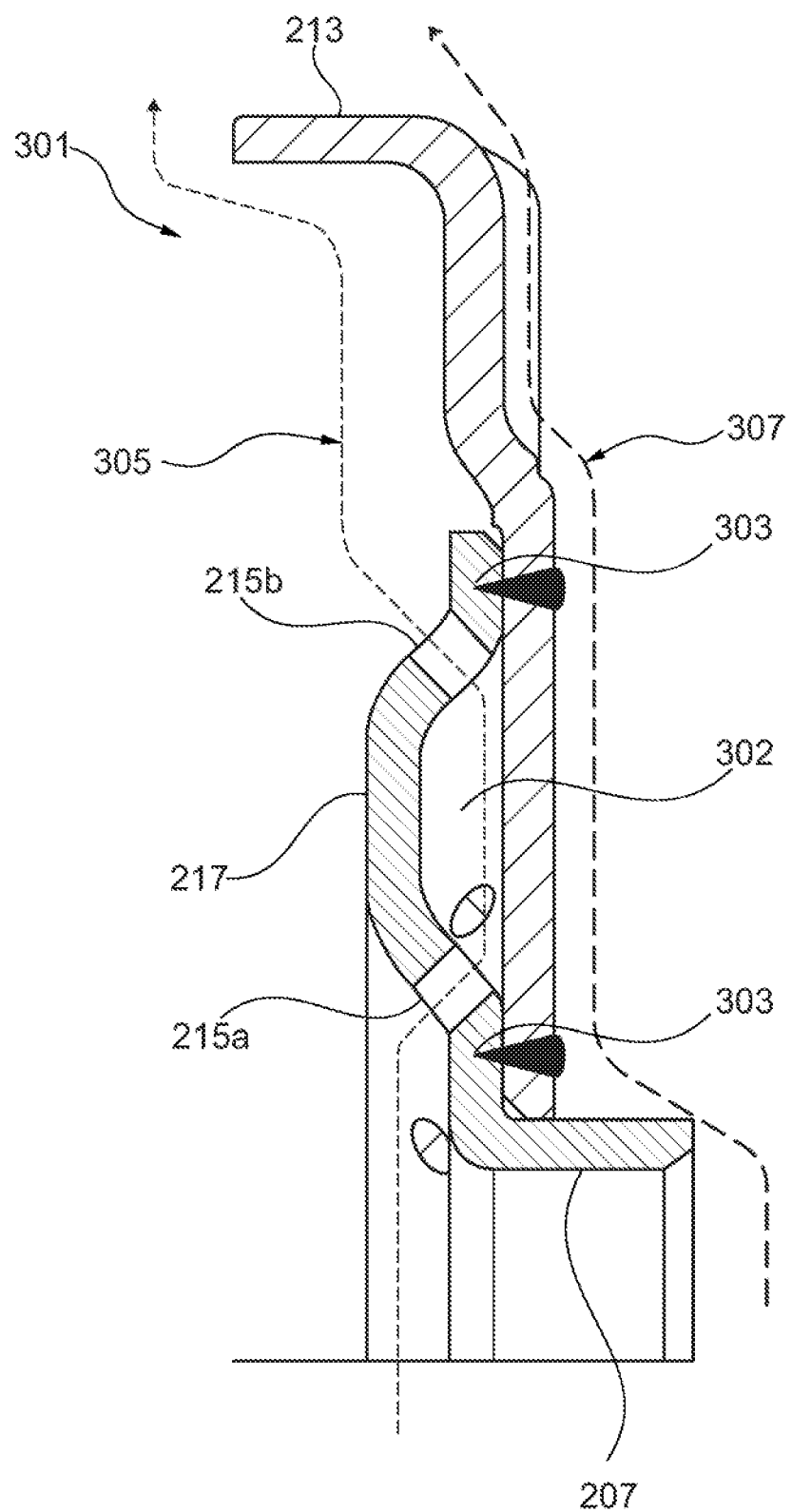
FIG. 3 is an illustration of a partial cross-sectional view of a centering flange for a torque converter.

FIG. 3 is an illustration of a partial cross-sectional view of a centering flange for a torque converter. The centering flange 301 may be made up of a first sub-assembly 201 and second sub-assembly 203. The centering flange 301 may join the first sub-assembly 201 and the second sub-assembly 203 utilizing welding techniques. The sub-assemblies may have welds 303 located at contact points of the first and second sub-assembly. Many forms of welding may be utilized to join the sub-assemblies, including laser welds. Upon the sub-assemblies being welded, the sub-assemblies may be cooled to join the sub-assemblies at contact points or joints where the welds 303 occurred. The holes 215 that are formed or inserted into the flange may have connect to a gap between 302 the two plates once they are welded together. The top portion of the flange may be laser welded in certain locations, such as the contact points that are in contact with both the first and second sub-assemblies.

Upon the sub-assemblies being welded or joined together, a gap 302 may be defined between the first sub-assembly 201 and the second sub-assembly 203. The gap 302 may take shape of the sides of the first sub-assembly and the second sub-assembly that face each other. For example, the gap may be defined based on a curvature section of the first sub-assembly 201 that is not in contact with the second sub-assembly 203. As explained further below, the gap 302 may facilitate movement of a pressure path alongside the first sub-assembly.

The centering plate may have a first pressure path 305 alongside the first sub-assembly and a second pressure path 307 alongside the second sub-assembly. The first pressure path 305 may occur when a vehicle transmission is in operation. The first pressure path 305 may have higher pressure than the second pressure path 307, or in some embodiments, the second pressure path 307 may have a higher pressure than the first pressure path 305. The first pressure path 305 may flow from a transmission input shaft alongside the first sub-assembly 201, wherein the pressure path 305 enters the first sub-assembly 201 through a first hole 215a. Upon the pressure path 305 being within the first sub-assembly 201, the pressure path 305 may exit the first sub-assembly 201 through the first set of holes 215a and flow through the gap 302. The pressure path 305 may then re-enter the first sub-assembly 201 through another set of holes 215b in contact with the gap 302. Upon re-entering the first sub-assembly, the pressure path 305 may exit the sub-assembly 201 through another set of holes 215b. The first pressure path 305 may then make its way to the engine by traveling alongside the first sub-assembly 201 or second sub-assembly 203.

The centering plate or centering flange may have a second pressure path 307 alongside the second sub-assembly. When the piston is applied, fluid pressure may act against the piston to engage the clutch. When the clutch is released, the pressure acting on the piston may be reduced to allow the piston to move (e.g. in an axial direction towards the cover 108). For example, the second pressure path 307 may be used to reduce reaction force on piston when applying the piston. The holes 215 within the centering flange may facilitate the first pressure path 305 to flow during both stroke and release of the piston. The second pressure path 307 may occur when a vehicle transmission is in operation. The second pressure path 307 may flow from a transmission input shaft alongside the second sub-assembly. The second pressure path 307 may travel alongside a recess 221 of the second sub-assembly 203. The second pressure path 307 may then make its way along the recess 221 of the second sub-assembly to the piston by traveling alongside the second sub-assembly 203.

Figure 4A:
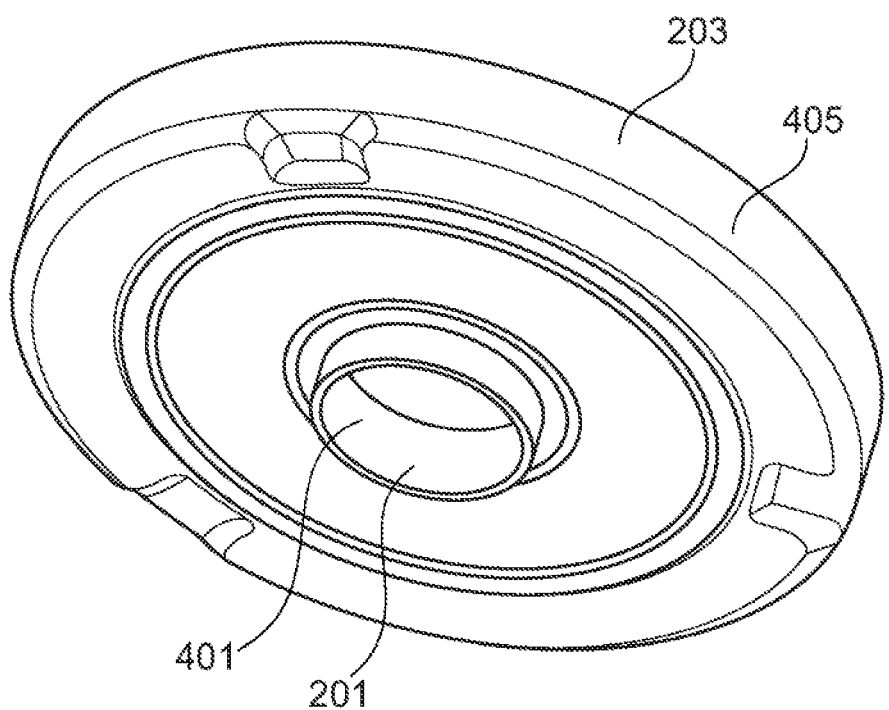
FIG. 4A is an illustration of a front perspective view of a centering plate.
Figure 4B:
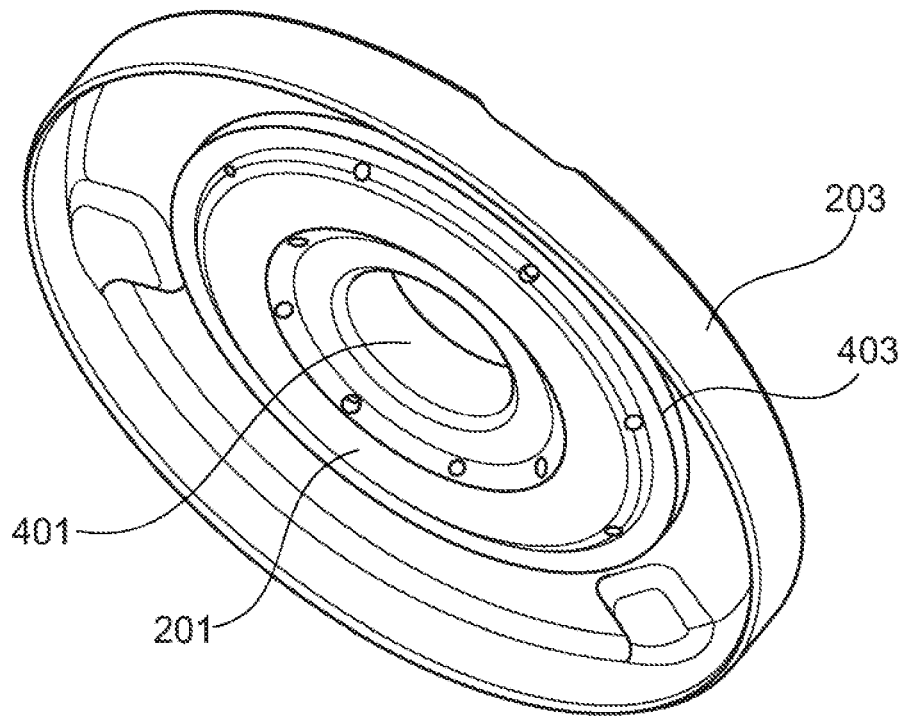
FIG. 4B is an illustration of a rear perspective of a centering plate.

FIG. 4A is an illustration of a front perspective view of a centering flange. FIG. 4B is an illustration of a rear perspective of a centering plate. As shown in FIG. 4A, the first sub-assembly 201 may be joined to the second sub-assembly 203 to create a centering flange. The first sub-assembly may have an inner diameter (ID) 401 and an outer diameter (OD) 403 as depicted in FIGS. 4A and 4B. The first sub-assembly may have a protrusion (e.g. circumferential protrusion or any other type of protrusion) that extends axially outward from the second sub-assembly, as depicted in FIG. 4A. Additionally, the second sub-assembly 203 may have a second sub-assembly OD 405.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST REFERENCE SYMBOLS torque converter 100
clutch 102
cover 108
backing plate 109
piston plate 110
leaf spring 111
hydraulic chamber 112
clutch plate 113
chamber 114
turbine shell 117
turbine 118
turbine hub 119
stator 120
one-way clutch 121
impeller 122
impeller shell 123
impeller hub 124
transmission 180
input shaft 182
input shaft bore 188
first sub-assembly 201
second sub-assembly 203
centering surface 205
lead-in portion 209
sealing surface 213
holes 215
contact side 217
first recess 219
second recess 221
centering flange 301
gap 302
welds 303
pressure path 305
first pressure path 305
second pressure path 307
inner diameter 401
outer diameter 403
second sub-assembly outer diameter 405

What is claimed is:

1. A flange for a torque converter, comprising:
a first sub-assembly that includes a first hole and a second hole located along the first sub-assembly and wherein the first and second hole are configured to facilitate movement of a first pressure path from a transmission input shaft to a piston; and
a second sub-assembly that includes one or more welds that join a first contact-side of the second sub-assembly to the first sub-assembly, wherein a gap is defined between an area where the second sub-assembly is joined with the first sub-assembly, and wherein the second sub-assembly is configured to facilitate movement along a second pressure path from the transmission input shaft to piston.

2. The flange of claim 1, wherein the second pressure path has lower pressure than the first pressure path.

3. The flange of claim 1, wherein the holes are further configured to facilitate movement of the first pressure path flows through the gap.

4. The flange of claim 1, wherein the holes are further configured to facilitate movement of the first pressure path from the first hole to the gap, and then to the second hole.

5. The flange of claim 1, wherein the first and second sub-assembly include a first and a second centering surface configured to align the first and second sub-assembly, wherein the first centering surface is on the first sub-assembly and the second centering surface is located at an end of the second sub-assembly.

6. The flange of claim 5, wherein the centering surfaces are in contact with one another.

7. The flange of claim 1, wherein the second sub-assembly includes a first recess formed at the first contact-side of the second sub-assembly.

8. The flange of claim 7, wherein the second sub-assembly includes a second side opposite the first contact-side of the second sub-assembly, wherein the second side includes second recess.

9. The flange of claim 1, wherein the torque converter is a four-pass torque converter.

10. The flange of claim 1, wherein the first and second holes are located along a curvature section of a top-portion of the first sub-assembly.

11. A method of manufacturing a flange for a torque converter, comprising:
forming one or more holes in a top-portion of a first sub-assembly of the torque converter, wherein the holes are configured to facilitate movement along a first fluid-pressure path from a transmission input shaft to a piston, wherein the first fluid-pressure path is formed along a gap between the first sub-assembly and a second sub-assembly;
welding a first contact-point and second contact-point of the first sub-assembly and the second sub-assembly, such that the gap is defined between the first contact-point and the second contact-point of the first and second sub-assembly; and
cooling the first sub-assembly and second sub-assembly until the first and second sub-assembly are joined.

12. The method of claim 11, wherein the method further includes sealing a first end of the first sub-assembly to a transmission input shaft.

13. The method of claim 12, wherein the method further includes the step of centering the first sub-assembly and second sub-assembly along centering surfaces of the first and second sub-assembly.

14. The method of claim 13, wherein the holes are arranged to facilitate movement of a first pressure path from a transmission input shaft to a piston.

15. The method of claim 14, wherein the method further includes the step of installing the flange into a four-pass torque converter.

16. The method of claim 11, wherein the second sub-assembly includes a first recess located along a first side of the second sub-assembly in contact with the first sub-assembly and a second recess located along a second side of the second sub-assembly not in contact with the first sub-assembly.

17. The method of claim 16, wherein the second recess is configured to facilitate movement along a second fluid-pressure path.

18. The method of claim 11, wherein the torque converter is a three-pass design.

19. A flange for a torque converter, comprising:
a first sub-assembly that includes a top portion with one or more holes along the top portion; and
a second sub-assembly that includes a plurality of welds that join the second sub-assembly to the first sub-assembly, wherein the second sub-assembly is configured to form a gap between a first weld and a second weld and between the first sub-assembly and the second sub-assembly.

* * * * *